United States Patent [19]

Sasaki et al.

[11] Patent Number: 5,302,649
[45] Date of Patent: Apr. 12, 1994

[54] CURABLE FILM FORMING COMPOSITIONS

[75] Inventors: Yukihiko Sasaki, Claremont; Kevin Lossner, Monrovia, both of Calif.

[73] Assignee: Avery Dennison Corporation, Pasadena, Calif.

[21] Appl. No.: 452,563

[22] Filed: Dec. 14, 1989

Related U.S. Application Data

[63] Continuation of Ser. No. 57,504, Jun. 3, 1987, Pat. No. 4,948,825.

[51] Int. Cl.$^5$ .............................................. C08L 53/00
[52] U.S. Cl. ................... 524/274; 428/355; 522/110; 524/271; 524/272; 524/276; 524/483; 524/484; 524/486; 524/505; 524/534; 525/98; 525/193; 525/194
[58] Field of Search ............... 524/272, 274, 271, 483, 524/484, 486, 505, 276, 534; 525/98, 193, 194; 428/355; 522/110

[56] References Cited

U.S. PATENT DOCUMENTS

| | | | |
|---|---|---|---|
| 4,243,500 | 1/1981 | Glennon | 524/272 |
| 4,556,464 | 12/1985 | St. Clair | 524/271 |
| 4,948,825 | 8/1990 | Sasaki | 524/274 |

*Primary Examiner*—John Kight, III
*Assistant Examiner*—John M. Cooney, Jr.
*Attorney, Agent, or Firm*—Christie, Parker & Hale

[57] ABSTRACT

There are provided a pressure-sensitive adhesive and other compositions which free radical cured mixtures in which a halogenated hydrocarbon was present during free radical cure, of at least one unsaturated elastomeric polymer and at least one organic additive which is substantially nonresponsive to the action of free radicals and present in an amount sufficient to modify the properties of the cured elastomeric polymer.

21 Claims, No Drawings

CURABLE FILM FORMING COMPOSITIONS

CROSS-REFERENCE TO RELATED APPLICATIONS

This application is a continuation of and is entitled to the benefit of the filing date of U.S. patent application Ser. No. 07/057,504, filed Jun. 3, 1987, now U.S. Pat. No. 4,948,825, incorporated herein by reference.

BACKGROUND OF THE INVENTION

This invention is directed to reducing the energy required to improve the properties of multicomponent polymer systems which form pressure-sensitive adhesives.

More particularly, the invention is related to the use of halogenated crosslinking agents for radiation (EB & UV) curing of adhesives containing unsaturated elastomeric polymers, such as unsaturated block copolymers, especially, though not limited to, styrene-isoprene block copolymers, e.g., linear SI, SIS, multi-armed $(SI)_x$. Halogenated materials significantly enhance the facility of free-radical materials crosslinking of pressure-sensitive adhesive formulations containing unsaturated elastomers, leading, at lower levels of free-radical generating energy, to a higher degree of crosslinking, which is manifested by the formation of more insoluble gel, lower swelling ratios, and significant improvements in adhesive performance at elevated temperatures.

Conventional crosslinking systems for such adhesives have been based upon the use of polyfunctional acrylates or methacrylates. Polythiols have also been effectively used. These materials exhibit a number of disadvantages: for example; curing may cause a considerable loss of peel and tack, and the thermal instability of the crosslinkers requires in-line static mixing immediately prior to coating for hot melt processes. Many of the halogenated materials, in contrast, are thermally stable and are ideally suited to hot melt (100% solids) processing, although they may also be used in solution or emulsion processes.

Properties of unsaturated pressure sensitive adhesive compositions can be improved by use of actinic radiation, such as ultraviolet (UV) radiation; electron beam (EB) radiation. Normally, the adhesive is applied to facestock and/or a release liner and subjected to a suitable curing action to improve such properties as elevated temperature shear.

One means of cure is electron beam (EB) radiation. While the facestock and/or release liner can sustain electron beam dosages up to a certain level, e.g., 80 to 100 kiloGray (kGy), going beyond that level can result in degradation of components of adhesive label and tape constructions such as the face stock and/or release liner and/or adverse reactions between the adhesive and the silicon release agent of the release liner.

Increased radiation requirements, whether EB or actinic, will reduce the speed at which an adhesive coated substrate can pass under the radiating surface or increase the number of radiating surfaces. Both are costly.

The present invention is directed to reducing the energy required to achieve a positive modification in a pressure sensitive adhesive formed of at least two components, one an unsaturated elastomeric polymer component, the other an organic additive component which is one or more organic additives which are at least dispersable in the elastomeric component. Typically, the organic additive component is provided to tackify or plasticize the elastomeric component.

SUMMARY OF THE INVENTION

According to the present invention, there are provided pressure-sensitive adhesive compositions which comprise in combination at least one unsaturated elastomeric polymer capable of undergoing gel forming reactions in the presence of free radicals preferably generated by actinic radiation or electron beam radiation, and at least one organic additive normally a tackifier or plasticizer which is substantially nonresponsive to free radicals and which are at least dispersable and preferably soluble in the polymer and an effective amount of a halogenated crosslinking agent. The elastomeric polymer preferably has a glass transition temperature of from about $-20°$ to about $-100°$ C. The organic additive affects a property of the pressure-sensitive adhesive composition, such as tack or other properties. The improvement resides in the use of a halogenated hydrocarbon crosslinker with organic additive which is substantially nonresponsive to the action of free radicals, as defined herein, to provide, upon cure, at reduced energy input, a pressure-sensitive adhesive composition having a glass transition temperature of at least $10°$ C., preferably at least $20°$ C. below use temperature.

After cure, with the increase of gel content, the combination exhibits a positive change in properties such as elevated temperature shear. This occurs at substantially lower levels of free radical generation than would have been required were the organic additive to consume a significant amount of free radicals.

The present invention is directed to the use of a particular class of organic additives; namely, halogenated hydrocarbons which reduce the incipient gel dosage requirement for the compositions and provide, upon cure, a pressure-sensitive adhesive composition where less actinic or electron beam energy is required to initiate gel formation. The preferred halogenated organic additions for the purposes of this invention are chlorinated polyethylene and brominated hydrocarbons which are also fire retardants and which have been found to be able to be successfully added to SIS block copolymers to reduce incipient gel dosage. Specific examples of thermally stable halogenated hydrocarbons are hexabromocyclododecane, 1,2-dibromoethyl-3,4-dibromocyclohexane, tetra bromo-bis-phenol A, bis allyl ether, poly(tribromostyrene) and the like.

DETAILED DESCRIPTION

The present invention is directed to reducing the energy requirements of free radical cross-linking of unsaturated polymers, preferably elastomeric polymers which are part of multicomponent compositions such as pressure-sensitive adhesives (PSA) in which the unsaturated polymers are tackified or otherwise modified as to physical properties by addition of at least one organic additive.

We have found that halogenated hydrocarbons enhance the free-radical crosslinking of PSA formulations containing unsaturated polymeric materials. Within the broad class of materials containing halogenated functionality, a number of thermally stable compounds may be found which are ideally suited for use in free-radical crosslinking agents of hot melt pressure-sensitive adhesive formulations. Compatibility of these substances with ordinary components of PSA formulae is variable;

but chlorinated polyethylene certain commercial fire-retardant chemicals have been found to be particularly suitable for curing SIS, SI, SBS, and SB based PSA's. The enhancement of cure has been demonstrated for both ultraviolet (with and without photoinitiators) and electron beam processes.

Properties of the pressure-sensitive adhesive composition are, in accordance with the present invention, enhanced by free radical cure, with free radicals preferably generated by electron beam (EB) radiation, or actinic radiation, such as ultraviolet (UV) curing, with or without photoinitiators and/or photosensitizers. The improvement resides in utilizing as a property modifying additive, an organic additive which is substantially nonresponsive to the action of free radicals in combination with a halogenated hydrocarbon serving as a cross-linking agent to reduce the energy required to achieve cure.

By the term "organic additive which is substantially nonresponsive to the action of free radicals" (also organic additive herein) there is meant saturated organic compounds and organic compounds which, when blended with an unsaturated elastomeric polymer in proportions of about 40 parts by weight of the unsaturated elastomeric polymer and 60 parts by weight organic compound, will form a blend having a relative incipient gel dosage, i.e. the ratio of incipient gel dosage of the blend to the incipient gel dosage of the unsaturated elastomeric polymer, of no more than about 1.85, preferably 1.65. The measurement is made for a blend which is free of external cross-linking agents and for an EB radiation at 200 KV.

For electron beam radiation, incipient gel dosage is determined as a minimum amount of electron beam (EB) dosage in kiloGray required to form a toluene insoluble gel. Insoluble gel is measured by placing 200 milligrams of a directly irradiated sample into 10 grams of toluene checking for the presence of insoluble material after 24 hours standing. Radiation is increased (or decreased) in increments of 10 kGy. If the solution appears clear upon visual inspection it is filtered through qualitative filter paper to check for the presence of gel. The procedure is repeated for each 10 kGy dosage level increment and the dosage at which gelation occurs is interpolated from the data. If a gel was not observed, for example, at 60 kGy, but was at 70 kGy, the value of incipient gel dosage is reported as 65 kGy. In each instance, the sample is coated from a toluene solution onto a release paper (50-75 g/m$^2$) and dried in an oven. The sample surface was directly exposed to EB radiation at 200 KV with inerting to 400 ppm O$_2$ or less. For values reported herein, the EB unit used was manufactured by Energy Sciences.

By the preferred use of organic additives which are substantially nonresponsive to the action of free radicals, the energy required to achieve a level of cross-linking within the unsaturated elastomeric copolymer can remain unchanged and independent of organic additive concentration.

The halogenated crosslinking agents also reduce incipient gel dosage but in consequence of being free-radical generations. As such, they also reduce the amount of external free energy required for cure.

Used with other organic additives which are substantially non-responsive to the action of free radicals, the halogenated crosslinking agents of this invention comprise thermally stable halogenated hydrocarbon, preferably chlorinated polyolefins, chlorinated polyethylene, and bromonated hydrocarbons. The presently preferred additives include 1,2-dibromo ethyl-3,4-dibromocyclohexane; hexabromo-cyclododecane; tetrabromo-bisphenol A; bis (allyl ether); poly(tribromostyrene) and the like.

For unsaturated compounds, saturation to a level sufficient to meet the definition can be achieved by hydrogenation or otherwise eliminating aromatic or aliphatic unsaturation with addition of groups which do not consume free radicals. In the alternative, saturated or partially hydrogenated organic compounds may be blended with saturated and/or highly saturated organic additives to achieve the desired result, namely a reduction of incipient dosage requirements to acceptable levels.

While not limiting, the invention will, for simplicity, be described in terms of improving the properties of pressure-sensitive adhesives based on unsaturated natural and synthetic elastomeric polymers including, but not limited to, block, random or multiarmed copolymers and mixtures thereof. Among the useful unsaturated elastomeric polymers there may, however, be mentioned natural rubber, polybutadiene, polyisoprene, butyl rubber, ethylene propylene diene rubbers, styrene-butadiene block copolymers, styrene-butadiene-styrene block copolymers, styrene-isoprene block copolymers, styrene-isoprene-styrene block copolymers, multiarmed styrene-isoprene block copolymers and the like. Useful unsaturated elastomeric polymers are also disclosed in U.S. Pat. No. 4,556,464 to St. Clair incorporated herein by reference.

Preferably, the elastomeric block polymers to which the invention is directed are ABA block or multiarmed (AB)$_x$ block copolymers, wherein x has a value of 2 or more and mixtures thereof and wherein A is a block comprising at least one monoalkenyl arene, preferably styrene, alpha methyl styrene, vinyl toluene and the like, and B is an elastomeric conjugated diene block such as a polybutadiene or a polyisoprene block with polyisoprene blocks preferred. More preferably, the elastomeric copolymers are formed of styrene-butadiene-styrene block copolymers and/or styrene-isoprene-styrene block, multiarmed styrene-isoprene block copolymers, polybutadiene and polyisoprene. Mixtures of elastomers may be employed.

Unsaturated elastomeric polymers forming the base resin of the invention are or may be adapted to hot melt, solvent or emulsion coating. They are preferably free radical cross-linked using actinic radiation, with or without a photoinitiator, or by electron beam (EB) radiation. Cure is to overcome the major deficiency of pressure-sensitive adhesives based on unsaturated elastomeric polymers, namely, to have acceptable elevated temperature cohesive strength. Crosslinking of the base polymer has been used to enhance cohesive properties of the adhesives especially to improve elevated temperature shear performance.

Thermal crosslinking during hot melt processing of unsaturated elastomeric polymers may be achieved using the halogenated crosslinking agents of this invention. The systems still, with precaution, may be benefited by the use of external crosslinkers. Crosslinkers which are multifunctional monomers such as acrylates and methacrylates are thermally reactive and the process to achieve cure also requires in-line mixing to avoid premature crosslinking independent of the ultimate means of cure. The same is true of other crosslinking agents which are functional at much lower concentrations. Polythiol crosslinkers, for instance, are functional at concentrations of about 10% or less by weight of the total crosslinkers used in the composition. The polythiol crosslinkers include for instance, pentaerythritoltetrathioglycolate, pentaerythritol-tetra(3-mercaptopropionate), trimethylolethanetrimercaptopropionate, trimethylolpropanetrithioglycolate, trimethylolpropane tri(3-mercaptopropionate) and the like.

As with the multifunctional acrylates and methacrylates, the polythiol cross-linkers are preferably added to the composition by in line mixing. The purpose is to avoid premature crosslinking before cure the pressure sensitive adhesive composition.

The unsaturated elastomeric base copolymers are not normally pressure sensitive adhesives and pressure-sensitive adhesive properties are induced by the addition of other hydrocarbon materials known as tackifiers. One use of the organic additives of this invention is as a tackifier.

To avoid excess consumption of free radicals and the introduction of excess energy into the system, any significant amount of hydrocarbon added to modify the properties of the elastomeric resin is in the form of organic additives which are substantially nonresponsive to free radicals. Their inclusion does not substantially affect the ability to achieve improved elevated temperatures properties such as shear by the action of the free radicals and add their beneficial properties, e.g., tack to the cured product.

As examples of organic additives which are substantially nonresponsive to free radicals there may be mentioned hydrogenated organic compounds, such as hydrogenated aromatic resins including hydrogenated polystyrene, polyalpha-methyl styrene, polyvinyl toluene, copolymers of styrene with other monomers and the like; hydrogenated aliphatic resins derived from petroleum based products; highly hydrogenated rosins and rosin esters; hydrogenated white oil, mineral oil and the like. As specific tackifiers employed in the practice of the invention there may be mentioned hydrogenated styrene based resins such as Regalrez TM resins designated as 1018, 1033, 1065, 1078, 1094 and 1126 manufactured and sold by Hercules, Inc.; Regalrez TM 6108 a 60% hydrogenated aromatic resin, also manufactured by Hercules; hydrogenated $C_5$ and/or $C_9$ hydrocarbon feed stocks such as Arkon TM P-70, P-90, P-100, P-125, P115, M-90, M-100, M-110 and M-120 resins manufactured and sold by Arakawa Chemical and Regalite TM R-100, MGB-63, MGB-67, MGB-70, resins manufactured and sold by Hercules, Inc.; hydrogenated Polycyclo-pentadienes such as Escorez TM 5320, 5300 and 5380 resins manufactured and sold by Exxon Chemical, hydrogenated polyterpene and other naturally occurring resins such as Clearon TM P-105, P-115, P-125, M-105, M-115 manufactured and sold by Yasuhara Yushi Kogyo Co. Ltd. of Japan and Eastotack TM H-100, H-115 and H-130 resins manufactured and sold by Eastman chemical and the like; Kaydol TM hydrogenated mineral oil manufactured and sold by Witco Chemical and the like.

To be generally useful, organic aromatic additives should effectively be at least 50% preferably at least 60% saturated and for the aliphatic hydrocarbon at least 65% preferably 80% of unsaturated groups in the product as formed should be saturated or otherwise rendered nonresponsive to the action of free radicals. Complete saturation is preferred or at least saturation to a level where upon inclusion into the elastomer there will be a negligible additional consumption of free radicals over that required to achieve the same level of cure by crosslinking of the unsaturated elastomeric polymer. Some aromatic unsaturation is necessary for compatibility with butadiene containing elastomers.

Organic additives which serve a tackifying function normally present in a concentration ranging from about 40% to about 90% by weight, of mixture of total, preferably from about 45% to about 85% by weight of the mixture of unsaturated elastomeric polymers and tackifying organic additives. Compositions containing less than about 40% by weight of an organic additive typically do not have sufficient "quickstick" or initial grab and compositions having too high a tackifying organic additive have too low a cohesive strength even when cross-linked.

The compositions of the instant invention may be and normally are made up of components (unsaturated elastomeric polymer and organic additives) having multiple glass transition temperatures. To be functional as a pressure sensitive adhesive the composition must have at least one glass transition temperature at least about 10° C. below use temperatures, preferably at least 20° C. below use temperatures.

As compared to ABA block copolymers, the presently preferred unsaturated elastomeric polymers are multi-armed styrene isoprene block copolymers having the formulas $(SI)_x$ where x generally has a value greater than 2.

Linear styrene-isoprene (SI) and styrene-isoprene-styrene (SIS) block copolymers do not perform as well as multi-armed (SI) polymers in forming radiation-cured pressure sensitive adhesives at lower curing doses. This problem may be solved by the use of organic additives of this invention which, unlike most conventional tackifiers, do not consume an excessive amount of radical during crosslinking thereby conserving cost and product quality.

It has been found that high molecular weight styrene-isoprene multi-armed block copolymers, alone or together with other elastomers, such as SB, SBS and SIS when formulated with organic additives which are saturated, hydrogenated tackifying resins give pressure sensitive adhesive formulae which show superior ease of cure and when cured superior elevated temperature shear properties. Properties after cure, match or surpass the elevated temperature shear performance of any hot melt adhesives commercially available.

Presently preferred formulation ranges for high performance pressure-sensitive adhesives containing multi-armed (or radial) styrene-isoprene block copolymers are on a by weight basis as follows:

15–60 parts unsaturated elastomeric polymer(s)
85–40 parts tackifying organic additives
0–10 parts crosslinking agents Antioxidants are added as required. In low concentrations, the multiarmed block copolymers may be considered as an elastomeric crosslinking additive.

Base unsaturated elastomeric polymers used were a mixture of linear styrene-isoprene-styrene (SIS) and styrene-isoprene (SI) block copolymers known as Kraton TM D-1107 and D-1111; styrene-butadiene-styrene (SBS) block copolymers known as Kraton TM D-1101 and D-1102 and DX-1300 and multi-armed $(SI)_x$ block copolymer known as Kraton TM D-1320X[1] all manufactured and sold by Shell Chemical Company and styrene-butadiene block copolymer known as Solprene TM 1205 manufactured and sold by Housemex, Inc. As representative of an unsatisfactory tackifying unsaturated aliphatic resin there was used Escorez ™ 1310, a petroleum based hydrocarbon resin manufactured and sold by Exxon Chemical Company, and Piccolite ™ A-115, an alpha-pinene resin manufactured and sold by Hercules, Inc. Foral-85, a well known hydrogenated rosin ester manufactured and sold by Hercules, Inc. may be functional or nonfunctional as an organic additive depending on the elastomer(s) it is combined with. The organic additives which are used to illustrate the instant invention are of the Escorez ™ 5000 series. Also used to illustrate the practice of the invention are Regalrez ™ 6108, 1078 and 1000 series of resins. Kaydol ™ mineral oil was as a representation of hydrogenated oil. The invention is primarily illustrated in respect of effect of unsaturation of the organic compound, namely, a tackifier, on incipient or relative incipient gel dosage (the incipient gel dosage of a mixture divided by the incipient gel dosage of the elastomer) required to initiate gel formation versus resin concentration in percent by weight. Incipient gel dosage is measured as defined above. To establish product properties, the formulation was coated from toluene onto a release paper (50 g/m$^2$), dried in an oven and laminated to a 50 micron thick polyester film. EB radiation was through the polyester film. 180° Peel in Newtons per Meter (N/M) were determined using PSTC-1 at 20 minute dwell. Loop tack was measured by forming a loop from a 1 inch by 8 inch strip, adhesive face out, inserted in the jaws of an Instron tester and moving the loop at the rate of 12 inches per minute onto a stainless steel panel, then removing the strip at the rate of 12 inches per minute as soon as one square inch of contact is made. The highest force required to remove the loop is reported in N/M. Shear reported in Kiloseconds (K.S.) was for 0.5×0.5 inch overlap on a stainless steel panel at a 500 gram force load.
[1] Also known as TRW-6-1523 and DX-XL.

While the invention has been described in terms of pressure sensitive adhesives, it embraces other cured compositions comprising a free radical cured mixture of at least one unsaturated elastomeric polymer and at least one organic additive which is substantially nonresponsive to the action of free radicals and present in an amount sufficient to modify a physical property of the elastomeric polymer.

The presently preferred system for using halogenated hydrocarbons and radiation curing involves the use of styrene-isoprene block copolymers, such as Kraton D-1107, D-1111, D-1320X, etc., in conjunction with saturated, hydrogenated tackifying resins such as those found in, but not limited to, the Regalrez 1000 and Escorez 5300 series. The range of concentrations for such formulae might vary between 20 and 60% rubber and 40 to 80% tackifying resin, with up to 0 and about 10% halogenated hydrocarbon in the formulae to serve as a tackifier. Formulae may also include photoinitiators or thermal radical initiators such as benzoyl peroxide or AIBN. Among the fire-retardant materials screened, those with low melting points seem to exhibit the best compatibility and performance. Brominated compounds are preferred over fluorinated or chlorinated, because of the greater lability of the carbon-bromine bond with respect to high energy radiation. The material which has shown the best performance of all those screened to date is 1,2-dibromoethyl-3,4-dibromocyclohexane, which is available from Ethyl Corp. under the trade name Saytex BCL-462.

A typical radiation-curable PSA formula might be described by the following proportions:
  35% Styrene-isoprene block copolymer
  65% Hydrogenated tackifying resin
  1-4 pph brominated hydrocarbons
  (1-4 pph photoinitiators)
  0.5-2 pph antioxidants Examples of the present invention are shown in Tables 1-8. As can be seen, halogenated hydrocarbons such as brominated hydrocarbon fire retardants, can be successfully added to Kraton ™ 1107 and reduce incipient gel dosage.

TABLE 1

Incipient gel dose effects with Kraton D-1107

| Kraton D-1107 | BCL-462 | HBCDD | BE-51 | Pyrochek | Incipient Gel (kGy) |
|---|---|---|---|---|---|
| control | — | — | — | — | 85 ± 5 |
| 98 | 2 | — | — | — | 55 ± 5 light gel |
| 95.2 | 4.8 | — | — | — | 55 ± 5 |
| 87 | 13 | — | — | — | 55 ± 5 |
| 95.2 | — | 4.8 | — | — | 65 ± 5 |
| 95.2 | — | — | 4.8 | — | 55 ± 5 |
| 95.2 | — | — | — | 4.8 | 65 ± 5 |

BCL-462 = 1,2-dibromoethyl-2,3-dibromocyclohexane (Ethyl)
HBCDD = hexabromocyclododecane (Great Lakes)
BE-51 = tetrabromo-bis-phenol A, bis(allyl eter) (Great Lakes)
Pyrochek = poly(tribromostyrene) (Pyrochek 68PB, Ferro)

TABLE 2

Incipient gel dose effects of chlorinated polyethylene with Kraton D-1107 linear SIS rubber

| Kraton D-1107 | Regalrez 1078 | CPE 4211 | AO 330 | DLTDP | Incipient Gel (kGy) |
|---|---|---|---|---|---|
| control | — | — | — | — | 95 ± 5 |
| 40 | 58 | 2 | 0.5 | 0.5 | 55 ± 5 |
| 40 | 56 | 4 | 0.5 | 0.5 | 55 ± 5 |

TABLE 3

Incipient gel dose effects with multiarmed (Si)$_x$

| TRW-6-1523 | Escorez 5300 | Regalrez 1065 | AO330 | DLTDP | BCL-462 | Incipient Gel (kGy) |
|---|---|---|---|---|---|---|
| pure rubber | — | — | — | — | — | 25 ± 5 |
| 30 | 31 | 39 | 0.5 | 0.5 | 3 | 5 ± 5 |

TABLE 4

Incipient gel dose effects with SBS/SI based adhesives

| I-406 | DX-1300 | Piccolyte A115 | Shellflex 371 | AO330 | DLTDP | BLC-462 | Incipient Gel (kGy) |
|---|---|---|---|---|---|---|---|
| 100 | — | — | — | — | — | — | 250 ± 10 |
| 100 | — | — | — | — | — | 5 | 155 ± 5 |
| — | 40 | 50 | 10 | 0.8 | 0.8 | — | 155 ± 5 |
| — | 40 | 50 | 10 | 0.8 | 0.8 | 5 | 85 ± 5 |
| — | 40 | 50 | 10 | 0.8 | 0.8 | BE-51 5 | 75 ± 5 |
| — | 40 | 50 | 10 | 0.8 | 0.8 | BA-43 | <=20 |

TABLE 4-continued

Incipient gel dose effects with SBS/SI based adhesives

| I-406 | DX-1300 | Piccolyte A115 | Shellflex 371 | AO330 | DLTDP | BLC-462 | Incipient Gel (kGy) |
|---|---|---|---|---|---|---|---|
| | | | | | | | 5 |

I-406 = FID (US) adhesive consisting of Kraton D-1101, Solprene 1205, Piccolyte A-115, Hercolyn D and AO 330.
BA-43 = Bis-acrylate of bis(hydroxythylether) of tetrabromo-bis-phenol A

TABLE 5

Effects of 1,2-dibromoethyl-3,4-dibromocyclohexane on the adhesive properties of a Kraton D-1107 formulation
Basic formula for 131-21 A to D: 25 Kraton D-1107, 8.2 Escorez 5320, 66.8 Regalrez 1065,
0.5 Ethyl 330 and 0.5 Cyanox LTDP

| Formula | Parts BCL-462 | EB Dose (kGy) | Looptack (N/m) | 180° Peel (N/m) | 70° C. DySh (kPa) | 70° C. ETS (ks) |
|---|---|---|---|---|---|---|
| 131-21A | 0 | 0 | 4290 sf/c | 2200 c | 9.4 c | 1 c |
| -21A | 0 | 70 | 3270 sf/c | 2170 c | 45.7 c | 10 f/p |
| -21B | 2 | 70 | 4030 sf/c | 2330 c | 52.8 c | 500+ |
| -21C | 4 | 70 | 3770 sf/c | 2200 c | 76.4 f/p | 3.3 f/p |
| -21D | 6 | 70 | 3670 sf/c | 2170 | 47.2 c | 2.5 c/f |

70° C. DySh = dynamic shear test at 70° C.; 0.2"/min crosshead speed. 0.5" × 0.5" stainless steel facestock
70° C. ETS = aluminum facestock 1" × 1", 1 kg load. Lower values of formulae with high content of BCL-462 may be due to overcure or other effects.

TABLE 6

Quantitative gel yeilds (percent total sample) for Table 5 samples by the MGP method (THF solvent)

| Formula | BCL-462 | 50 kGy | 70 kGy |
|---|---|---|---|
| 131-21A | 0 | 4.7 | 19.2 |
| 131-21B | 2 | 12.3 | 18.6 |
| 131-21C | 4 | 15.9 | 20.8 |
| 131-21D | 6 | 18.1 | 18.8 |

TABLE 7

Quantitive gel yields for Kraton D-1107 and Regalrez 1065 (percent total sample) by the MGP method (THF solvent)

| KrD-1107 | R-1065 | BCL-462 | 25 kGy | 50 kGy | 75 kGy |
|---|---|---|---|---|---|
| 100 | 0 | 0 | 1.0 | 0.0 | 70.0 |
| 100 | 0 | 5 | 0.6 | 7.8 | 62.8 |
| 35 | 65 | 0 | 0.2 | 0.6 | 9.4 |
| 35 | 65 | 5 | 1.5 | 25.6 | 30.5 |
| 20 | 80 | 0 | 0.6 | 0.7 | 14.0 |
| 20 | 80 | 5 | 1.5 | 17.6 | 19.2 |

TABLE 8

Effects of 1,2-dibromoethyl-3,4-dibromocyclohexane on the SAFT performance of a styrene-isoprene block copolymer adhesive

| Kraton D-1320X | Kr D-1111 | R-1094 | R-1033 | BCL-462 | Dose (kGy) | SAFT (°C.) |
|---|---|---|---|---|---|---|
| 25 | 10 | 54 | 11 | 0 | 70 | 126 ± 4 |
| 25 | 10 | 45 | 20 | 2 | 70 | 155 ± nc |

In Table 1, a control composition is compared with Examples having varying amounts of additions to "Krayton D-1107", as indicated, with the incipient gel dose effects reported in the table.

The examples in Table 2 indicate the incipient gel dose effects of chlorinated polyethylene with "Krayton D-1107" and examples in Tables 3 and 4 show the incipient gel dose effects in other systems.

Table 5 shows the effects of a preferred brominated hydrocarbon on the adhesive properties of a "Kraton D-1107" formulation against a control sample with o EB dose (kGy). The quantitative gel yields for the examples in Table 5 are given in Table 6, including the control example.

Table 7 also provides quantitative gel yields for Krayton D-1107 and Regalrez 1065 and the brominated hydrocarbon (BCL-462). As can be seen, the examples with BCL-462 have higher EB dose values. Table 8 shows the improved SAFT performance of the example with the brominated hydrocarbon.

The first sample does not constitute a true control, as the compounding and coating method differed between the two samples and the resin mix was slightly different for both. However, the differences would lead one to expect lower SAFT for the second sample; thus, the effect of BCL-462 (1,2-dibromoethyl-3,4-dibromocyclohexane) is shown. More data with true controls are in preparation.

Similar results may be expected for the cure response of other rubber based materials which use other elastomers, such as butyl rubber, SBR, etc.

CONTROLS 1–4

The following study was performed to establish the effect of using conventional tackifying resins to tackify elastomers on the electron beam (EB) dosage required to achieve incipient gel formation as a function of tackifier (resin) content. There was employed SIS elastomeric polymers known as Kraton TM D-1107 (Control 1), SBS block copolymers Kraton TM D-1101 (Control 2) and DX 1300 (Control 3) and Kraton TM D-1320X, a multi-armed styrene-isoprene block copolymers (Control 4).

The study established, first of all, the base level of EB dosage necessary to achieve a cohesive strength improvement as evidenced by gel formation in the base elastomer, more particularly, where at least 10% of the elastomer of adhesive composition formed an insoluble gel. Since conventional elastomer based pressure-sensitive adhesives contain about 40–90% by weight added tackifying resins, this means that the typical adhesive formulations required an EB dosage of 2–5 times higher than the dosage required for the elastomer itself to achieve an incipient gel formation when an unsaturated C-5 hydrocarbon Escorez TM 1310, (Controls 1 and 4) and Piccolite A-115 alpha-pinene (Controls 2 and 3) tackifiers are used as the tackifying resins. The elastomer requiring the lowest dosage was the multiarmed $(SI)_x$ copolymer.

EXAMPLES 1 AND 2

To illustrate the invention there was used Regalrez TM 1033 an 100% hydrogenated (saturated) aromatic resin manufactured by Hercules, Inc. (Example 1) and Escorez TM E-5380, a saturated aliphatic hydrocarbon manufactured by Exxon (Example 2). The comparison was Control 1. As can be seen incipient dosage to gel increased in proportion to the amount of unsaturated tackifying resin introduced to the rubber whereas the use of the hydrogenated tackifiers causes the incipient dosage to remain the same or in some instances reduced.

EXAMPLE 3 AND CONTROL 5

Using the same procedure as the previous Examples and Controls the effect of a saturated tackifier, Escorez TM 5380, (Example 3) and an unsaturated tackifier, Escorez TM 1310 (Control 5) have on the relative incipient gel dosage required to achieve gel formation for a multi-armed styrene-isoprene block copolymer (Kraton TM -D-1320X) was compared.

CONTROLS 6 AND 7 AND EXAMPLES 4 TO 7

Table 9 tabulates the improved high temperature properties induced to Kraton TM D-1107 and Kraton TM D-1320X using as the saturated tackifier Regalrez TM 1078. While 180° peel remain essentially unchanged there is dramatic improvement in elevated temperature shear.

TABLE 9

| Component Parts | Cont 6 | Ex 4 | Ex 5 | Cont 7 | Ex 6 | Ex 7 |
|---|---|---|---|---|---|---|
| Kraton TM D-1107 | 35 | 35 | 35 | — | — | — |
| Kraton TM D-1320X | — | — | — | 35 | 35 | 35 |
| Regalrez TM 1078 | 65 | 65 | 65 | 65 | 65 | 65 |
| Antioxidant | 1 | 1 | 1 | 1 | 1 | 1 |
| EB Dosage, kGy | 0 | 75 | 100 | 0 | 75 | 100 |
| 180° Peel at 23° C., (N/M) | 1490 | 1770 | 1460 | 1690 | 1220 | 1320 |
| 180° Peel at 70° C., (N/M) | 350 | 440 | 310 | 320 | 390 | 320 |
| Looptack. (N/M) | 1490 | 2300 | 2350 | 1690 | 1220 | 1320 |
| Shear at 70° C., (K.S.) | 1.1 | 4.4 | 7.2 | 0.15 | 7 | 17.8 |

CONTROL 8 AND EXAMPLES 8 AND 9

The relative incipient gel formation dosage for Kraton TM D-1107 using an aromatic tackifier of different levels of unsaturation was compared. They are manufactured and sold by Hercules, Inc., under the designation Piccolastic TM A-50 (0% hydrogenated), Regalrez TM 3102 (30% hydrogenated); Regalrez TM 6108 (60% hydrogenated) and Regalrez TM 1033 (100% hydrogenated). The higher the degree of hydrogenation the lower the dosage required, for a given level of resin concentration, to form a gel. This is important since a certain amount, usually 30-40% of the base rubber, must be crosslinked to form a network in order to achieve a significant improvement in physical properties.

CONTROLS 1 AND 9 AND EXAMPLE 6

As recognized, partially hydrogenated rosins have been used as premium tackifier resins for a long time. One of the best is Foral 85 manufactured by Hercules, Inc. According to information available from Hercules, Inc., it is about 60% hydrogenated. FIG. 5 establishes that for Kraton TM D-1107, Foral 85 (Control 8) is on a comparative basis significantly better than Escorez TM 1310 (Control 1) as a relatively low free radical consumer but not as good as Example 6 where Regalrez TM 1033 a saturated hydrocarbon was used as the tackifier.

CONTROLS 10 TO 15 AND EXAMPLES 10 TO 15

Endex TM 160 is an aromatic end-block reinforcing resin compatible with the polystyrene phase of the block copolymer Kraton D-1107 but not compatible with the elastomeric polyisoprene phase. It does not substantially interfere with crosslinking in presence of an organic additive (Table 10) or a blend thereof (Table 11), but synergistically provided exceptionally high elevated temperature shear strength on EB cure.

CONTROLS 16, 17 AND 18, EXAMPLES 16, 17 AND 18

The following is to show that a mixture of saturated tackifiers Escorez TM 5300 and Regalrez TM 1065 can be used to improve high temperature shear performance of a multiarmed styrene-isoprene rubber Kraton TM D-1320X.

The formulations in parts by weight is shown in Table 10 and the adhesive properties as a function of EB dosage in Table 13 wherein "ETS" means elevated temperature shear in kiloseconds.

TABLE 10

| Formula | Elastomer | Escorez TM 5300 | Regalrez TM 1065 |
|---|---|---|---|
| 1 | 30 | 11.7 | 58.3 |
| 2 | 30 | 30.9 | 39.1 |
| 3 | 40 | 44.2 | 15.8 |

TABLE 11

|  | Cont 10 | Ex 10 | Cont 11 | Ex 11 | Cont 12 | Ex 12 |
|---|---|---|---|---|---|---|
| Kraton D-1107, parts | 40 | 40 | 40 | 40 | 40 | 40 |
| Regalrez 1078, parts | 60 | 60 | 60 | 60 | 60 | 60 |
| Endex 160, parts | — | — | 10 | 10 | 15 | 15 |
| Antioxidant, parts | 1 | 1 | 1 | 1 | 1 | 1 |
| EB dosage (kGy) | 0 | 75 | 0 | 75 | 0 | 75 |
| 180° C. Peel, (N/M) | 1110 | 1160 | 1350 | 1220 | 1190 | 1000 |
| Looptack, (N/M) | 1890 | 1880 | 2250 | 1860 | 1890 | 1540 |
| 70° C. Shear (K.S.) | 0.1 | 3.2 | 3.2 | 50.1 | 6.7 | 81.7 |

TABLE 12

|  | Cont 13 | Ex 13 | Cont 14 | Ex 14 | Cont 15 | Ex 15 |
|---|---|---|---|---|---|---|
| Kraton D-1107, parts | 40 | 40 | 40 | 40 | 40 | 40 |
| Regalrez 1078, parts | 40 | 40 | 40 | 40 | 40 | 40 |
| Escorez 5320, parts | 20 | 20 | 20 | 20 | 20 | 20 |
| Endex 160, parts | 0 | 0 | 10 | 10 | 15 | 15 |
| Antioxidant, parts | 1 | 1 | 1 | 1 | 1 | 1 |
| EB dosage (kGy) | 0 | 75 | 0 | 75 | 0 | 75 |
| 180° Peel, (N/M) | 1340 | 1300 | 1340 | 1430 | 1360 | 1260 |
| Looptack, (N/M) | 2170 | 2140 | 1570 | 1710 | 1540 | 770 |
| 70° C. Shear, (K.S.) | 6 | 60.3 | 69.1 | 807 | 51.4 | 854 |

TABLE 13

| Cont/Ex | FORMULA | EB DOSAGE(kGy) | LOOPTACK | 180° PEEL, RT | 180° PEEL, 70° C. | ETS, 70° C. |
|---|---|---|---|---|---|---|
| Cont. 16 | 1 | 0 | 2550 | 1670 | 140 | 0.2 |
| Ex. 16 | 1 | 75 | 2410 | 1620 | 190 | 9.9 |

TABLE 13-continued

| Cont/Ex | FORMULA | EB DOSAGE(kGy) | LOOPTACK | 180° PEEL, RT | 180° PEEL, 70° C. | ETS. 70° C. |
|---|---|---|---|---|---|---|
| Cont. 17 | 2 | 0 | 2570 | 1600 | 65 | 0.1 |
| Ex. 17 | 2 | 75 | 1260 | 1520 | 265 | 25.2 |
| Cont. 18 | 2 | 0 | 1950 | 1350 | 245 | 3.0 |
| Ex. 18 | 3 | 75 | 1220 | 1240 | 280 | 218.2 |

EXAMPLE 19

The multiarmed copolymer Kraton ™ D-1320X has an incipient gel dosage of 25 kGy. A mixture of 30 parts of the multiarmed copolymer, 31 parts Escorez ™ 5300 and 39 parts Regalrez ™ 1065 also required 25 kGy to achieve incipient gel formation.

CONTROL 20 AND EXAMPLES 26-29

Control 20 and Examples 26-29 are for the combination of an SBS copolymer Kraton ™ D-1102 tackified with a mixture of Regalrez ™ 6108 and Kadol Oil a hydrogenated mineral oil in the presence of trimethylolpropane tri(3-mercaptopropionate) as a multifunctional polythiol crosslinker. As can be seen in Table 14, the combination gives on cure excellent elevated temperature shear.

TABLE 14

|  | Cont 15 | Ex 26 | Ex 27 | Ex 28 | Ex 29 |
|---|---|---|---|---|---|
| Kraton D-1102 | 40 | 40 | 40 | 40 | 40 |
| Regalrez 6108 | 50 | 50 | 50 | 50 | 50 |
| Kaydol Oil | 10 | 10 | 10 | 10 | 10 |
| TMPTMP* | 0 | 0.6 | 0.6 | 1 | 1 |
| Antioxidant | 1 | 1 | 1 | 1 | 1 |
| EB dosage (kGy) | 0 | 20 | 50 | 20 | 50 |
| 180° Peel, (N/M) | 1390 | 1180 | 1120 | 1130 | 1060 |
| Looptack, (N/M) | 1750 | 1352 | 1770 | 1850 | 1110 |
| 70° C. Shear, (K.S.)** | 1 | 2.3 | 120+*** | 11.8 | 120+*** |

*TMPTMP is trimethylolpropane tri(3-mercaptopropionate)
**Weight is 1000 g and overlap area is 1 sq. in.
***No failure

What is claimed is:

1. A pressure-sensitive adhesive comprising a free radical cured mixture of at least one unsaturated elastomeric polymer present in a total amount of from about 10 to about 60 parts by weight of the mixture and at least one organic additive which is substantially nonresponsive to the action of free radicals, said organic additive selected from the group consisting of aromatic organic additives which are at least 50% saturated and aliphatic organic hydrocarbon additives in which at least 65% of the unsaturated groups of the hydrocarbon as formed are saturated, the total of organic additive being present in an amount of from about 90 to about 40 parts by weight of the mixture, said cured adhesive having a glass transition temperature at least 10° C. below use temperature and an elevated temperature shear higher than the elevated temperature shear prior to cure, and in which a crosslinking agent comprising a brominated hydrocarbon is present during free radical cure of the mixture.

2. A pressure-sensitive adhesive as claimed in claim 1 wherein said brominated hydrocarbon is at least one compound selected from the group consisting of hexabromocyclododecane and 1,2-dibromoethyl-3,4-dibromocyclohexane.

3. A pressure-sensitive adhesive as claimed in claim 1 in which the organic additive is present in a concentration of about 45 to about 85 percent by weight based on the weight of the elastomeric polymer and organic additive.

4. A pressure-sensitive adhesive as claimed in claim 1 in which the unsaturated elastomeric polymer is selected from the group consisting of styrene-butadiene block copolymers, styrene-butadiene-styrene block copolymers, styrene-isoprene block copolymers, styrene-isoprene-styrene block copolymers, multiarmed-styrene-isoprene block copolymers, polybutadiene, polyisoprene and mixtures thereof.

5. A pressure-sensitive adhesive as claimed in claim 3 in which the unsaturated elastomeric polymer is selected from the group consisting of styrene-butadiene block copolymers, styrene-butadiene-styrene block copolymers, styrene-isoprene block copolymers, styrene-isoprene-styrene block copolymers, mulitarmed-styrene-isoprene block copolymers, polybutadiene, polyisoprene and mixtures thereof.

6. A pressure-sensitive adhesive as claimed in claim 1 in which the organic additive is selected from the group consisting of saturated aliphatic resins, saturated aromatic resins, saturated oils and mixtures thereof.

7. A pressure-sensitive adhesive as claimed in claim 5 in which the organic additive is selected from the group consisting of saturated aliphatic resins, saturated aromatic resins, saturated oils and mixtures thereof.

8. A pressure-sensitive adhesive as claimed in claim 4 in which the organic additive is selected from the group consisting of saturated aliphatic resins, saturated aromatic resins, saturated oils and mixtures thereof.

9. A pressure-sensitive adhesive as claimed in claim 1 in which the unsaturated elastomeric polymer is selected from the group consisting of ABA block copolymers; multiarmed $(AB)_x$ block copolymers and mixtures thereof, wherein A is a block comprising at least one monoalkenyl arene, B is an elastomeric conjugated diene block and x has a value greater than 2.

10. A pressure-sensitive adhesive as claimed in claim 3 in which the unsaturated elastomeric polymer is selected from the group consisting of ABA block copolymers; multiarmed $(AB)_x$ block copolymers and mixtures thereof, wherein A is a block comprising at least one monoalkenyl arene, B is an elastomeric conjugated diene block and x has a value greater than 2.

11. A pressure-sensitive adhesive as claimed in claim 9 in which the organic additive is selected from the group consisting of saturated aliphatic resins, saturated aromatic resins, saturated oils and mixtures thereof.

12. A pressure-sensitive adhesive which comprises a free radical cured product of a mixture comprising, based on the weight of the mixture, from about 15 to about 60 parts by weight of an unsaturated elastomer polymer component, from about 85 to about 40 parts by weight of a tackifying organic additive which is selected from the group consisting of saturated aliphatic resins, saturated aromatic resins, saturated oils and mixtures thereof, and an effective amount of a brominated hydrocarbon crosslinking agent, present in an amount up to 10 parts by weight, said cured pressure-sensitive adhesive having a higher elevated temperature shear as compared to the mixture prior to cure and a glass transition temperature of at least 10° C. below use temperature.

13. A pressure-sensitive adhesive according to claim 12 wherein said brominated hydrocarbon is at least one compound selected from the group consisting of hexabromocyclododecane and 1,2-dibromoethyl-3, 4-dibromocyclohexane.

14. A pressure-sensitive adhesive as claimed in claim 12 in which the unsaturated elastomeric polymer component comprises at least one unsaturated elastomeric copolymer selected from the group consisting of styrene-butadiene block copolymers, styrene-butadiene-styrene block copolymers, styrene-isoprene block copolymers, styrene-isoprene-styrene block copolymers, multi-armed styrene-isoprene block copolymers, polybutadiene, polyisoprene and mixtures thereof.

15. A pressure-sensitive adhesive comprising a free radical cured mixture comprising from about 15 to about 55 parts by weight of an unsaturated styrene-isoprene-styrene block copolymer and from about 85 to about 45 parts by weight tackifying organic additive selected from the group consisting of saturated aromatic resins, saturated aliphatic resins, saturated oils and mixtures thereof, said pressure-sensitive adhesive having a higher elevated temperature shear as compared to the mixture prior to cure and a glass transition temperature at least 10° C. below use temperature, and in which a brominated hydrocarbon crosslinking agent was present during free radical cure of the mixture.

16. A pressure-sensitive adhesive as claimed in claim 14 in which is present prior to cure an end block reinforcing agent which is compatible with the styrene blocks.

17. A pressure-sensitive adhesive according to claim 16 wherein said brominated hydrocarbon is at least one compound selected from the group consisting of hexabromocyclododecane and 1,2-dibromoethyl-3,4-dibromocyclohexane.

18. A pressure-sensitive adhesive comprising a free radical cured mixture comprising, based on the weight of the mixture, from 15 to about 55 percent by weight of the mixture a multiarmed styrene-isoprene block copolymer and from about 45 to about 85 percent by weight of the mixture of an organic additive which is selected from the group consisting of saturated aromatic resins, saturated aliphatic resins and mixtures thereof, said pressure-sensitive adhesive having a high elevated temperature shear as compared to the mixture prior to cure and a glass transition temperature of at least 10° C. below use temperature, and in which a brominated hydrocarbon crosslinking agent was present during free radical cure of the mixture.

19. A pressure-sensitive adhesive as claimed in claim 18 in which is present prior to cure an end block reinforcing agent which is compatible with the styrene blocks.

20. A pressure-sensitive adhesive comprising a free radical cured mixture in which a brominated hydrocarbon was present during free radical cure of the mixture comprising, based on the weight of the mixture, from 15 to about 55 percent by weight of a styrene-butadiene-styrene block copolymer and from about 45 to about 85 percent by weight of an organic additive which is selected from the group consisting of aromatic resins and mixtures thereof with saturated aromatic, saturated aliphatic and saturated oils, said pressure-sensitive adhesive having a high elevated temperature shear as compared to the mixture prior to cure and a glass transition temperature of at least 10° C. below use temperature.

21. A pressure-sensitive adhesive as claimed in claim 20 in which is present prior to cure an end block reinforcing agent which is compatible with the styrene blocks.

* * * * *

UNITED STATES PATENT AND TRADEMARK OFFICE
CERTIFICATE OF CORRECTION

PATENT NO. : 5,302,649
DATED : April 12, 1994
INVENTOR(S) : Yukihiko Sasaki; Kevin Lossner It is certified that error appears in the above-indentified patent and that said Letters Patent is hereby corrected as shown below:

Column 1, lines 67,68, change "dispersable" to
-- dispersible --.

Column 2, line 13, change "dispersable" to
-- dispersible --.
Column 2, line 47, before "hexabromocyclododecane" insert
-- fire retardant brominated by diocarbons are --.

Column 3, line 1, after "polyethylene" insert -- and --.

Column 4, line 1, change "bromonated" to
-- brominated --.

Column 6, lines 36,37, change "amount of radical" to
-- amount of free radicals --.
Column 6, line 64, the footnote to the superscript is located at column 7, line 38.

Column 8, line 34, Table 1, change
"-2,3-dibromocyclohexane (Ethyl)" to
-- -3,4-dibromocyclohexane (Ethyl) --.
Column 8, line 36, change "eter" to -- ether --.
Column 8, line 60, Table 4, change "BLC" to -- BCL --.

Column 9, line 3, Table 4-continued, change "BLC" to
-- BCL --.
Column 9, line 6, change "hydroxythylether" to
-- hydroxyethylether --.

UNITED STATES PATENT AND TRADEMARK OFFICE
CERTIFICATE OF CORRECTION

PATENT NO. : 5,302,649
DATED : April 12, 1994
INVENTOR(S) : Yukihiko Sasaki; Kevin Lossner It is certified that error appears in the above-indentified patent and that said Letters Patent is hereby corrected as shown below:

Column 9, line 20, Table 5, change "0.2"/min" to
 -- 0.02"/min --.
Column 9, line 25, Table 6, change "yeilds" to
 -- yields --.
Column 9, line 34, Table 7, change "quantitive" to
 -- quantitative --.
Column 9, line 62, after "with" change "o" to -- 0 --.

Column 10, line 50, after "D-1320X," delete "a".

Column 11, line 3, change "an" to -- a --.

Signed and Sealed this

Tenth Day of January, 1995

BRUCE LEHMAN

*Attest:*

*Attesting Officer*  *Commissioner of Patents and Trademarks*